Feb. 16, 1943.   E. A. RICHARDS   2,311,574
BATTERY CHARGING EQUIPMENT
Filed Nov. 8, 1941

INVENTOR
E. A. Richards.
BY
ATTORNEY

Patented Feb. 16, 1943

2,311,574

UNITED STATES PATENT OFFICE 2,311,574

BATTERY CHARGING EQUIPMENT

Edward Arthur Richards, London, England, assignor to International Standard Electric Corporation, New York, N. Y.

Application November 8, 1941, Serial No. 418,345
In Great Britain December 7, 1940

4 Claims. (Cl. 171—314)

This invention relates to a device for regulating the voltage of a secondary battery that is undergoing automatic charging.

We have already disclosed, in the specification of United Kingdom Patent No. 516,135, an arrangement in which a thermally-operated relay is connected across the battery that is undergoing charge so as to operate when the battery voltage attains a predetermined maximum and in operating to bring about circuit changes such that it will not release until the battery voltage falls to a predetermined minimum. The function of the relay in relation to the charging is to introduce a resistance into the charging circuit when it operates and to remove it on release, thus providing alternative trickle charge and full charge respectively. However, as explained in the above-mentioned patent specification, we found it desirable not to use the thermally-operated relay directly, by means of normally-closed contacts shunting the resistance; but instead, to use a second relay controlled by the first so that it is operative when the first relay is inoperative, i. e., during full charge, and is released when the first is operative, i. e., during trickle charge. In this manner it is possible to make use of normally-open contacts for shunting the resistance, as is desirable when dealing with a heavy current, owing to their greater reliability.

In some cases this gives rise to the difficulty that the adjustments to determine the voltages at which the controlling relay operates and releases are not independent of one another. It is the object of the present invention to remove this difficulty.

The nature of the invention will be better understood from the following description of one embodiment thereof, taken in conjunction with the accompanying drawing.

Figure 1:
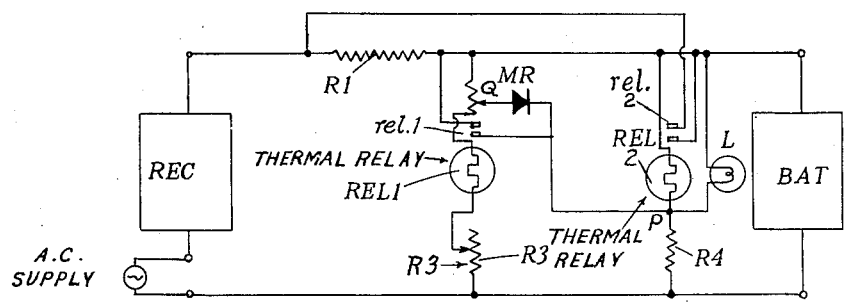
Figure 2:
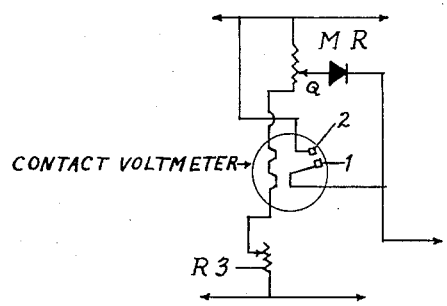

Referring to the drawing, Fig. 1 shows an arrangement for charging a battery BAT from the current derived from a rectifier REC, and Fig. 2 shows a modification which may be made in the arrangement of Fig. 1. In series with the battery BAT is a resistance R1. Connected in shunt with the battery is a resistance R2, a hot-wire vacuum relay REL 1 and an adjustable resistance R3 in series. A second hot wire vacuum relay REL 2 is connected in series with a resistance R4 across the battery BAT.

During charging of the battery BAT at full rate REL 2 is held operated and REL 1 is not operated, the resistance R4 being such in relation to R2 and R3 that the voltage across REL 2 is greater than across REL 1. Contacts rel 2 are closed and short circuit resistance R1. When REL 1 operates, on the battery attaining a voltage determined primarily by the adjustment of resistance R3, contacts rel 1 short circuit relay REL 2 and contacts rel 2 open to insert resistance R1 into the charging circuit of battery BAT and reduce the charging rate to that of trickle charge. Neglecting for the moment the presence of the rectifier MR, an adjustable point Q on resistance R2 is connected to the junction P between relay REL 2 and resistance R4 so that when contacts rel 1 are closed, part of resistance R2 is short circuited and the relay REL 1 will remain operated until the voltage across the battery BAT reaches a value several volts below that at which the relay operated.

Owing, however, to the fact that the voltage of the junction point P between relay REL 2 and resistance R4 is different from that of the point Q on resistance R2 to which P is connected, a "sneak" current flows through relay REL 1 which makes the adjustment of the upper and lower limits for the operation of relay REL 1 interdependent.

In order to render these adjustments independent of one another, a rectifier MR, preferably a selenium rectifier, is in accordance with the invention inserted as shown and prevents the flow of current between the junction P between relay REL 2 and resistance R4, and the adjustable point Q on resistance R2, whilst still allowing contacts rel 1 to shunt effectively a part of resistance R2.

The necessity for this arrangement arises from the fact that relay REL 1, being a thermal relay, has only one pair of contacts, which must perform the double function of short circuiting relay REL 2 and a portion of resistance R2. Accordingly the invention is applicable to similar arrangement in which the relay REL 1 is of such a nature that it can have only one pair of contacts, for example, a contact voltmeter. An arrangement in which the relay REL 1 is a contact voltmeter is shown in Fig. 2, wherein the contact 1 is on the moving arm of the voltmeter and the contact 2 is fixed.

A lamp L is provided in shunt of relay REL 2 to indicate when contacts rel 1 open and close, for the purpose of carrying out the adjustment.

What is claimed is:

1. A device for regulating the automatic charging of a secondary battery, comprising: a resistance in the charging circuit shunted by a pair of normally-open contacts, to furnish a full charging when the contacts are closed and a trickle charging when they are open; a relay for closing said contacts when it is operative, shunted by a pair of normally-open contacts so as to be operative when the contacts are open and released when the contacts are closed; a second relay for closing said second pair of contacts when it is operatively, connected across the battery in series with a resistance which is also shunted by said second pair of contacts, so as to operate when the battery attains a predetermined maximum voltage but to release only when the battery has fallen to a predetermined minimum voltage; and a rectifier in the connection between the two relays which exists by reason of their common connection to one of the second pair of contacts.

2. A device for regulating the automatic charging of a secondary battery, comprising: a thermally-operated relay connected across the battery so as to operate when the battery attains a predetermined maximum voltage and having a single pair of normally-open contacts; a second thermally-operated relay connected so as to be operative whenever the battery is at a voltage demanding full-charge and having a single pair of normally-open contacts shunting a resistance in the charging circuit so that a full charge is delivered when the contacts are closed and a trickle charge when the contacts are open; the contacts of the first relay shunting the second relay and shunting a resistance in series with the first relay; and a rectifier in the connection between said contacts and the resistance.

3. A device as claimed in claim 1 in which said second relay is a thermally-operated relay.

4. A device as claimed in claim 1 in which said second relay is a contact voltmeter.

EDWARD ARTHUR RICHARDS.